Patented Aug. 10, 1943

2,326,497

UNITED STATES PATENT OFFICE 2,326,497

WATER-SOLUBLE NITROGEN-CONTAINING HETEROCYCLIC COMPOUND

Oskar Riester, Dessau, and Gustav Wilmanns, Wolfen, Kreis Bitterfeld, Germany, assignors, by mesne assignments, to General Aniline & Film Corporation, New York, N. Y., a corporation of Delaware No Drawing. Application November 14, 1939, Serial No. 304,320. In Germany November 15, 1938

4 Claims. (Cl. 260—290)

This invention relates to water-soluble nitrogen-containing heterocyclic compounds.

The non-quaternary nitrogen-containing heterocyclic bases are for the most part very little soluble in water and obtain considerable water solubility only when their nitrogen atom is rendered quaternary by addition of alkyl acid radicals. The cyanine dyes obtained in the usual manner from such quaternary salts by condensation possess only small solubility in water in spite of the presence of the quaternary nitrogen in the form of the iodides as they are obtained by synthesis. Very often they must be transformed into more soluble salts, for instance chlorides or nitrates, and even this measure is often not sufficient for highly molecular dyestuffs. It is therefore necessary to employ organic solvents in order to obtain a clear solution of the dyestuffs. When pouring such solutions into aqueous gelatin solutions for instance for the production of filters there exists always the danger that the dyestuffs separates before dilution in the great amount of gelatin solution effects dissolution of the dye therein. The water solubility of the cyanines has paramount importance in the production of sensitized emulsions for films, plates and paper especially for the purpose of reproduction and color photography. In these fields there are not only requirements as regards intensity and fastness of the sensitization and as regards gradation but great stress is laid on the requirement, that the finished emulsion layer is not colored by the sensitizers. The hitherto known basic and acid sensitizing dyes fulfill these requirements only imperfectly. The finished emulsion layers nearly always show a more or less noticeable residual discoloration which may look yellow, reddish or blueish according to the wave lengths, for which the emulsion is sensitized. This discoloration is caused by the lack in water solubility of the hitherto employed cyanine dyes which causes the dye to be not entirely washed out of the gelatin layer by the treatment baths. The acid dyes of the eosin-class are easily soluble in water, but they possess to a certain degree substantive properties towards gelatin so that a complete washing out does not occur in this case.

We have found it to be advantageous to raise the water solubility of the heterocyclic nitrogen-containing compounds which serve as starting materials for the production of cyanine dyes. The cyanines prepared from these compounds themselves possess greater solubility in water.

According to this invention water-soluble heterocyclic compounds of this kind are obtained by introducing into an amino substituted derivative a quaternary ammonium-group by means of the amino-group. This object is achieved by reacting a nitrogen-containing heterocyclic base containing a benzene ring fused onto the heteroring, the benzene ring carrying an amino-group, such as for instance 2-methyl-6-amido-benzthiazole with an ω-halogen aliphatic acyl halide of altogether no more than 3 carbon atoms, for instance chloroacetyl chloride whereby a halogen-containing amide is produced. The temperatures used for this condensation depend upon the reactivity of the reactants. If the reactivity is great the reaction mass must be cooled below 0° C. if not it must be heated. As ω-halogen acyl halide especially chloroacetylchloride, β-chloropropionic acid chloride and the like may be employed. The intermediate product is then reacted by heating with a secondary or tertiary aliphatic, aromatic or heterocyclic amine to yield an easily water-soluble compound. Tertiary aliphatic amines such as for instance triethylamine, dimethylhydroxyethylamine etc. or also cyclic amines such as for instance pyridine, isoquinoline and their substitution products or heterocyclic amines such as for instance thiazoline, thiazole etc. are suitable for the purpose. Furthermore secondary amines may be used in which the nitrogen atom is a member of a ring such as for instance piperidine.

The reaction may be made more clear by the following formula:

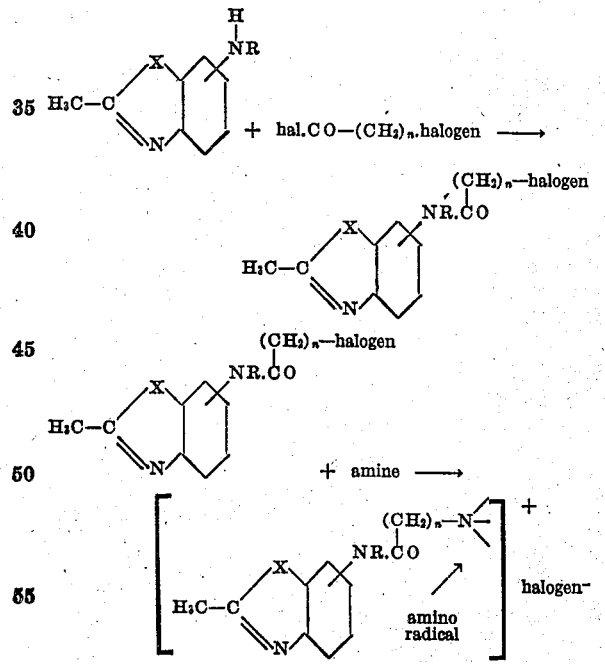

The line in the benzene nucleus is intended to show that the amino group may be in any of the four positions. X means an atom grouping capable of completing the hetero nucleus such as for instance S, O, Se,

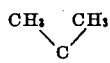

N-alkyl, N-aryl, N-aralkyl, —CH=CH—; R means H or alkyl; n means a whole number.

After transforming the compounds into the quaternary salts they can be condensed according to the usual methods employed in cyanine chemistry with various heterocyclics to yield cyanine-dyes of any desired constitution (carbocyanines, pseudocyanines, isocyanines, symmetrical monomethinecyanines, styryl dyes, long chain polymethinecyanines, rhodacyanines, merocyanines, etc.). The cyanine dyes thus obtained possess high water solubility.

*Example 1*

50 grams of 2-methyl-6-amidobenzthiazole are dissolved in 150 cc. of pyridine and 34 grams of chloroacetylchloride in 100 cc. benzene are slowly added at minus 10° C. After stirring for an hour 100 grams of ice are added and the colorless crystals of ω-chloroacetamido-2-methylbenzthiazole filtered and recrystallized from methanol. Melting point 174 to 175° C.

This product can be reacted with pyridine for instance in the following manner: 10 grams of the product are heated with 20 cc. of pyridine for half an hour to 115° C. and recrystallized after cooling from propanol. Melting point: 239° C. They can also be crystallized from methanol. The melting point is then 91° C. The product contains methanol in the crystals. The resulting product has the following formula:

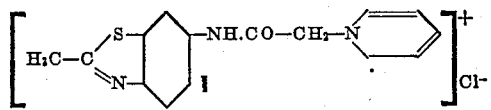

It can be reacted in known manner with diethylsulfate and can then be converted in pyridine with ortho-formic acid ester by heating for 3 hours to 110° C. to yield a red-violet dye of the following constitution:

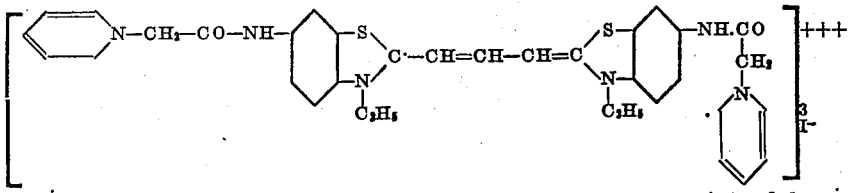

*Example 2*

The reaction product of 2-methyl-6-amidobenzthiazole with chloroacetylchloride named in Example 1 is heated to 120° C. for half an hour with double its weight of isoquinoline and the resulting product recrystallized from propanol. Melting point 243° C. The product has the following constitution:

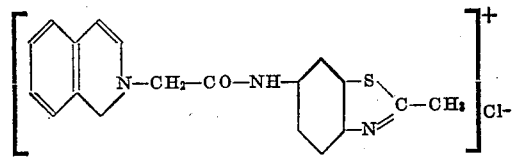

*Example 3*

5 grams of the 6-(ω-chloroacetylamido)-2-methylbenzthiazole named in Example 1 are heated to 100° C. for 5 minutes with 5 grams piperidine in the oil bath, when reaction sets in and the whole batch solidifies. The product is recrystallized from propanol. It has the following formula:

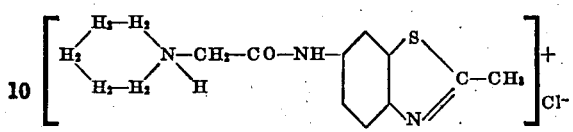

*Example 4*

From 2-methylbenzoxazol the 6-nitro-2-methyl-benzoxazole is prepared by nitrating in concentrated sulfuric acid and the latter reacted with stannous chloride in hydrochloric acid to yield 6-amido-benzoxazole of a melting point of 145° C. The latter can be converted with chloroacetylchloride in the manner described in Example 1 into a compound of the following constitution:

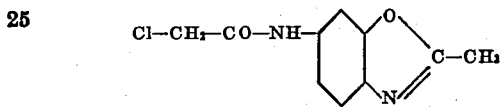

Further treatment follows the prescription given in Example 1.

*Example 5*

5-amidoquinaldine is reacted with chloroacetylchloride as described in Example 1. The following compound having a melting point of 189 to 190° C. is produced:

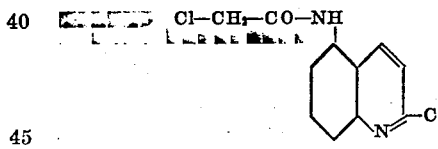

It is boiled for half an hour in 5 times its weight of pyridine at 110° C. and recrystallized after cooling with an addition of propanol. The compound obtained has a melting point of 137 to 139° C. and has the following constitution:

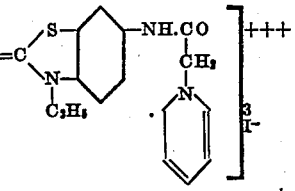

*Example 6*

The reaction product of 2-methyl-6-aminobenzthiazole with chloroacetylchloride named in Example 1 is heated to 90° C. with the same amount of dimethylhydroxyethylamine and the same amount of propanol. A reaction occurs during which a part of the propanol evaporates. The double amount of propanol is added and the reaction mass left to crystallize over night. The crystals obtained are washed with propanol and finally with dry ether and dried on clay. The following compound results in good yield:

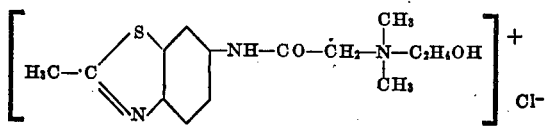

Melting point 168 to 170° C.

*Example 7*

50 grams of 2-methyl-6-aminobenzthiazole are dissolved in 150 grams of hot pyridine and after cooling to minus 10° C., there are slowly added 36 grams of β-chloropropionic acid chloride in 100 cc. dry ether while stirring. After an hour a reaction product having the constitution as follows is precipitated by addition of a great amount of ice:

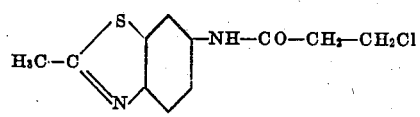

Melting point 118 to 119° C. from propanol.

3 grams of this product are heated in 2 cc. of pyridine in an oil bath to 110° C. for 3 quarters of an hour. 10 cc. of butanol are added and the reaction product precipitated with about 40 cc. of dry ether. It has the following constitution:

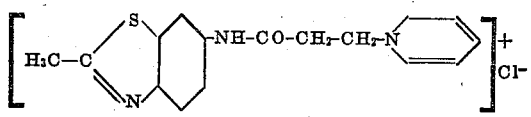

Melting point 265° C., decomposition from 250° C. upwards. It is easily soluble in the lower alcohols and flows with water.

*Example 8*

45 grams of 2-methyl-N-phenyl-5-amidobenzimidazole are dissolved in 150 cc. of pyridine and 22 grams of chloroacetylchloride in 100 cc. of ether are added drop by drop at minus 10° C. The mixture is stirred for another hour and then diluted with 200 cc. of ice, finally 22 grams of dry soda are added and cooled to minus 5° C. The separated product is filtered and recrystallized from propanol. Melting point 298° C. after sintering at 158° C. The product has the following constitution:

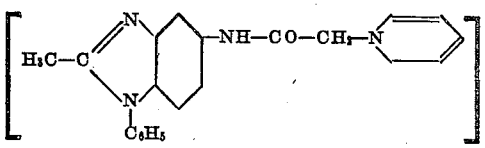

10 grams of this ω-chloroacetaminobenzimidazole are heated to the boil in 10 cc. of pyridine for half an hour. The product is fluid for a short while and then again solidification occurs. It is recrystallized from methanol and dried over night at 60° C. Melting point 206 to 207° C. Insoluble in ether and benzene, very easily soluble in water.

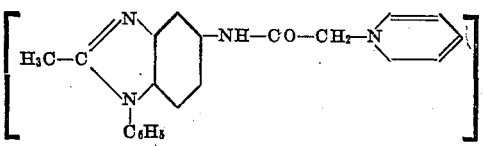

*Example 9*

18 grams of 2-methyl-mercaptobenzthiazole are dissolved in 40 cc. of concentrated sulfuric acid and nitrated at 0° with a mixture of 10 grams of concentrated sulfuric acid and 10 grams of nitric acid (specific gravity 1.30) inside 3 hours. Subsequently the mixture is poured on ice and the yellow-white product formed is crystallized from methanol.

20 grams of the 2-methylmercapto-5-nitrobenzthiazole obtained are added to 200 cc. of concentrated hydrochloric acid and reduced with 7.5 grams of stannous chloride at 60° C. The acid is hardly neutralized with sodium acetate and sulfuretted hydrogen is introduced until all tin is precipitated as the sulfide. The solution is made alkaline with caustic soda and extracted with benzene. After evaporation 2-methylmercapto-5-aminobenzthiazole crystallizes as a pale-yellow powder. Melting point 96° C.

6.5 grams of this thiazole are dissolved in 30 cc. of pyridine and 4 grams of chloroacetylchloride added at minus 5° C. The mixture is poured onto 100 cc. of ice, filtered and crystallized from propanol. Melting point 146 to 148° C.

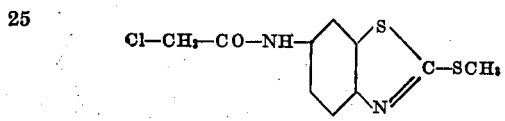

By warming with pyridine or another amine this product which is nearly insoluble in water yields an ammonium salt which is easily soluble in water.

We claim:

1. A compound having the following general formula:

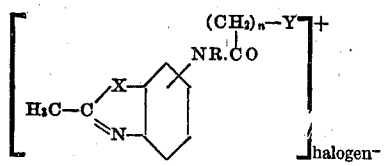

wherein X is a member selected from the group consisting of S, O, Se,

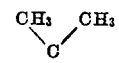

N-alkyl, N-aryl, N-aralkyl, —CH=CH—; R is a member selected from the group consisting of H or alkyl; $n$ is a whole number smaller than 3; Y is a member selected from the class consisting of

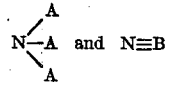

wherein A is selected from the group consisting of alkyl and aryl and N≡B is a radicle of a heterocyclic amine; wherein the acid amide radical is attached to any of the four positions of the benzene ring.

2. A compound of the following general formula:

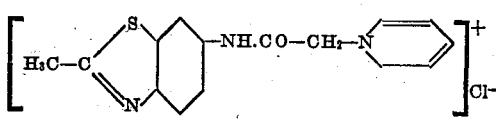

3. A compound of the following general formula:
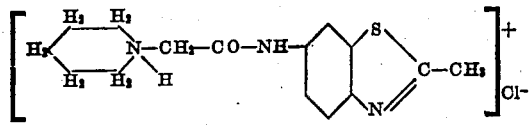
4. A compound of the following general formula:
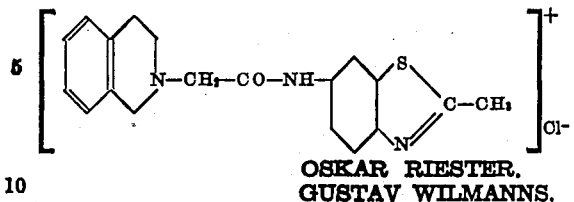
OSKAR RIESTER.
GUSTAV WILMANNS.